Patented Mar. 11, 1924.

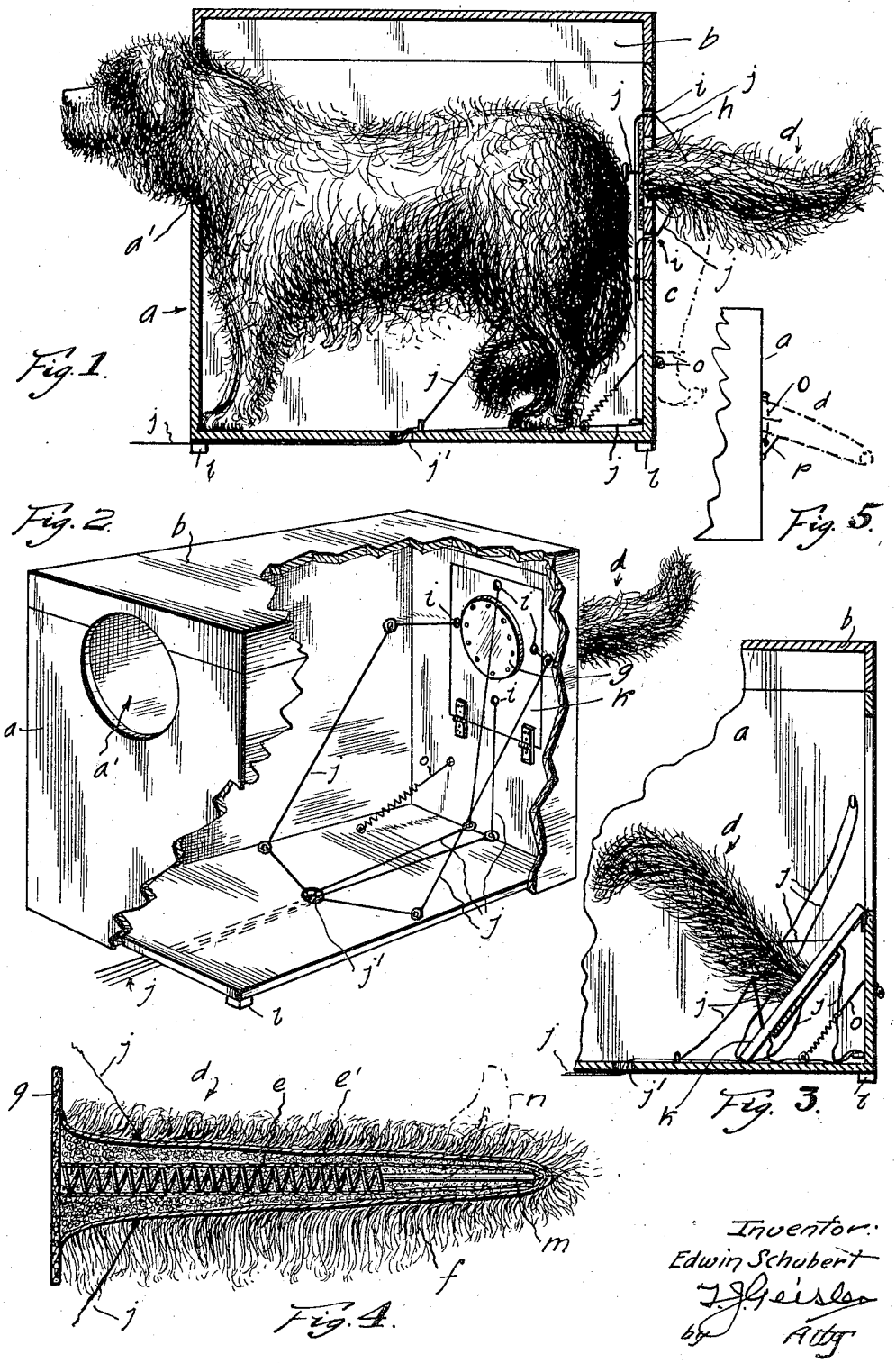

1,486,305

UNITED STATES PATENT OFFICE.

EDWIN SCHUBERT, OF NEW YORK, N. Y., ASSIGNOR TO HENRY GRINBAUM, OF NEW YORK, N. Y.

TRICK DEVICE FOR PERFORMANCES WITH ANIMALS.

Application filed December 14, 1922. Serial No. 606,886.

*To all whom it may concern:*

Be it known that I, EDWIN SCHUBERT, a citizen of the United States, and a resident of the city of New York, county of New York, and State of New York, have invented a new and useful Improvement in Trick Devices for Performances with Animals, of which the following is a specification.

The object of my invention is to provide a device by which trick performances may be given with an animal, causing the latter to appear to give intelligent responses to questions or biddings of the performer.

To this end my invention consists of a box in which an animal for example a dog, may be confined and concealed, with only its head projecting. At the opposite end of the box I provide a flexible projection, so covered, arranged and located as to have the appearance, at a distance, of being the dog's tail. This projection is so constructed as to be susceptible of angular motion, thereby to simulate the wagging of the dog's tail; and means are provided for effecting the desired angular motion.

These means for example, may consist of strings fastened to the artificial tail adjacent its base, the free ends of the strings being held by the performer so that he may wag this artificial tail in response to his own questions, and biddings, and thus make it appear as if the dog, by his own intelligence, were making these responses.

The construction and operation of my device, and incidental features are illustrated in the accompanying drawings, and hereinafter fully described.

In the drawings:

Fig. 1 is a vertical longitudinal section of the box showing the animal confined therein;

Fig. 2 is a perspective exterior view of the box with part of the side walls broken away to show interior mechanism;

Fig. 3 is a fragmentary section showing the hinged section supporting the tail in place within the box;

Fig. 4 is a longitudinal section thru the tail and diagrammatically shows details of construction; and Fig. 5 is a diagrammatic view showing a detail of construction.

The box $a$ is made of such size as to admit and thus completely conceal the body of the animal except its head, which is permitted to project thru the aperture $a'$ as illustrated in Fig 1. The box is provided with a removable section, as for example the cover $b$, so that the animal may be placed in the box. To the rear end $c$ of the box is fastened a projection $d$ which is covered with fur and so arranged and located as to have the appearance of being the animal's tail.

The projection may be conveniently constructed as shown in Fig. 4. It consists of a coil spring $e$ the hollow of which may be filled and the exterior thereof encased with cotton wadding as $e'$ thereby giving to the coil spring sufficient body. The elasticity of the spring gives this projection the property so that it will simulate in its motions the wagging of the tail. The wadding also provides a suitable base on which the outer cover of fur $f$ may be fastened. I prefer to fasten the tail to a strip of leather or other flexible material $g$. This material is secured to the end wall $c$ of the box over a hole $h$ thru which the artificial tail $d$ projects. A series of holes $i$ are made in the wall $c$ about the hole $h$ and strings $j$ are fastened to the tail adjacent its base and pass thru said holes $i$ and thru the body of the base to a point convenient to the hand of the operator. In order to conceal these manipulating strings they may be passed from the interior of the box thru a hole $j'$ again to the exterior along the bottom of the box as shown in Fig. 1, the base being provided with legs $l$ so as to space the same from the supporting surface sufficiently to permit the strings to be freely operated. By means of these strings the tail is given angular motion simulating the wagging of the animal's tail; the construction of the artificial tail being such as to permit said angular motions.

In order to facilitate the carrying about of the box $a$ it is convenient to provide the rear wall $c$ with a hinge section $k$ and to support the artificial tail $d$ on such hinge section so that in packing the box about the tail may be placed inside of the box as shown in Fig. 3.

In order that the tip of the tail may be curved in simulation of a characteristic trait of the animal the coil spring $e$ has affixed thereto a pliable section $m$ thus permitting the tip of the tail to be curved to one side as illustrated for example by the broken line $n$.

In order to substantially conceal the tail during the moment consumed in placing the animal in the box I provide a rubber band or other securing means *o* by which the tail is temporarily fastened down as illustrated in Figs. 1 and 3. In the performance given with this device the box is so arranged that the head of the animal will face the audience, thus the tail is concealed by reason of being temporarily fastened down as mentioned. During the placing of the animal in the box the tail is released and allowed to project and the box is turned sidewise to the audience so that they may observe the responsive wagging of the tail.

In Fig. 5 I have shown a device, preferably a rubber band *p*, which may be fastened around the base of the tail so as to hold the tail slightly on an angle when the strings *j* are manipulated, so as to simulate a characteristic trait of the animal.

The details of construction hereinbefore described are merely to be understood as representing such as I have found convenient for carrying my invention into practice.

I claim:

1. A box adapted for holding the body of an animal, such box provided with an opening thru which the head of the animal projects, the box having an exterior projection simulating the tail or other member of the animal confined in the box, and so located as to appear to be the tail of the animal, said tail being adapted to be given angular motion, means for imparting angular motion to said projection, and releasable means for so temporarily fastening the projection to the exterior of the box as to be concealed.

2. A box adapted for holding the body of an animal, such box provided with an opening thru which the head of the animal projects, the box having an exterior projection simulating the tail or other member of the animal confined in the box, and so located as to appear to be the tail of the animal, said projection being fastened to a movable wall portion of the box, so that it may be moved into the box, said tail being adapted to be given angular motion, and means for imparting angular motion to said projection.

3. A box adapted for holding the body of an animal, such box provided with an opening thru which the head of the animal projects, the opposite wall of the box having a hole, a flexible strip fastened over such hole, a coil-spring mounted on such strip to extend exteriorly of the box, said coil-spring being so made and located as to simulate the tail or other member of the animal confined in the box, and means for imparting angular motion to said coil-spring.

4. A box adapted for holding the body of an animal, such box provided with an opening thru which the head of the animal projects, the opposite wall of the box being provided with a movable section having a hole, a flexible strip fastened over such hole, a coil-spring mounted on such strip to extend exteriorly of the box, said coil-spring being so made and located as to simulate the tail or other member of the animal confined in the box, and means for imparting angular motion to said coil-spring.

5. A box adapted for holding the body of an animal, such box provided with an opening thru which the head of the animal projects, the opposite wall of the box having a hole, a flexible strip fastened over such hole, a coil-spring mounted on such strip to extend exteriorly of the box, said coil-spring being so made and located as to simulate the tail or other member of the animal confined in the box, means for imparting angular motion to said coil-spring, the tip of the latter being provided with a pliable section thereby to give to the tip of the artificial tail the curve characteristic of the animal.

EDWIN SCHUBERT.